United States Patent
Qin et al.

(10) Patent No.: US 10,775,677 B2
(45) Date of Patent: Sep. 15, 2020

(54) TRANSPARENT DISPLAY PANEL COMPRISING A TRIGGER COMPONENT CONNECTED TO A CHROMIC MATERIAL TO ENABLE REVERSIBLE CHANGE BETWEEN A TRANSPARENT STATE AND A COLORED STATE OF THE CHROMIC MATERIAL AND TRANSPARENT DISPLAY DEVICE HAVING THE SAME

(71) Applicant: BOE TECHNOLOGY GROUP CO., LTD., Beijing (CN)

(72) Inventors: Wei Qin, Beijing (CN); Xiaolong Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 190 days.

(21) Appl. No.: 16/009,536

(22) Filed: Jun. 15, 2018

(65) Prior Publication Data
US 2019/0086714 A1    Mar. 21, 2019

(30) Foreign Application Priority Data
Sep. 20, 2017   (CN) .......................... 2017 1 0850915

(51) Int. Cl.
*G02F 1/163*    (2006.01)
*G02F 1/1335*   (2006.01)
(Continued)

(52) U.S. Cl.
CPC ........... *G02F 1/163* (2013.01); *G02B 26/005* (2013.01); *G02F 1/1362* (2013.01);
(Continued)

(58) Field of Classification Search
CPC .......... G02F 1/133509; G02F 2201/44; G02F 1/161; G02F 1/13473; G02F 2001/15145;
(Continued)

(56) References Cited

U.S. PATENT DOCUMENTS

| | | | |
|---|---|---|---|
| 2003/0011728 A1 | 1/2003 | Battersby | |
| 2004/0140969 A1* | 7/2004 | Morita | ..................... G09G 3/20 345/204 |

(Continued)

FOREIGN PATENT DOCUMENTS

| CN | 1326111 C | 7/2007 |
|---|---|---|
| CN | 102879946 A | 1/2013 |

(Continued)

OTHER PUBLICATIONS

First Office Action for Chinese Patent Application No. 201710850915.5 dated Nov. 28, 2019.

*Primary Examiner* — Paul C Lee
(74) *Attorney, Agent, or Firm* — Calfee, Halter & Griswold LLP

(57) ABSTRACT

A transparent display panel is provided, including a liquid crystal cell, a chromic material and a trigger component. The liquid crystal cell includes an array substrate and a first transparent substrate disposed opposite each other. A liquid crystal layer is arranged between the array substrate and the first transparent substrate. The chromic material is arranged at a side of the first transparent substrate away from the array substrate. The trigger component is connected to the chromic material for enabling the chromic material to perform a reversible change between a transparent state and a colored state.

12 Claims, 2 Drawing Sheets

(51) Int. Cl.
  *G02F 1/155*       (2006.01)
  *G02F 1/1362*      (2006.01)
  *G02F 1/13357*     (2006.01)
  *G02B 26/00*       (2006.01)
  *G02F 1/1347*      (2006.01)
  *G02F 1/1514*      (2019.01)

(52) U.S. Cl.
  CPC .... *G02F 1/13473* (2013.01); *G02F 1/133509* (2013.01); *G02F 1/133621* (2013.01); *G02F 1/155* (2013.01); *G02B 2207/115* (2013.01); *G02F 2001/15145* (2019.01); *G02F 2201/44* (2013.01); *G02F 2203/62* (2013.01)

(58) Field of Classification Search
  CPC .............. G02F 2203/62; G02B 26/007; G02B 2207/115
  See application file for complete search history.

(56) References Cited

U.S. PATENT DOCUMENTS

| | | | | |
|---|---|---|---|---|
| 2007/0146267 | A1* | 6/2007 | Jang | G02F 1/1347 345/88 |
| 2009/0321728 | A1* | 12/2009 | Seo | H01L 27/3232 257/40 |
| 2014/0085578 | A1* | 3/2014 | Gu | G02F 1/133514 349/106 |
| 2015/0219974 | A1* | 8/2015 | Trajkovska-Broach | G02F 1/1525 359/275 |
| 2015/0338712 | A1 | 11/2015 | Gu | |
| 2015/0338714 | A1 | 11/2015 | Li | |
| 2016/0223878 | A1* | 8/2016 | Tran | G09G 3/38 |

FOREIGN PATENT DOCUMENTS

| | | |
|---|---|---|
| CN | 103207493 A | 7/2013 |
| CN | 103439846 A | 12/2013 |

* cited by examiner

TRANSPARENT DISPLAY PANEL COMPRISING A TRIGGER COMPONENT CONNECTED TO A CHROMIC MATERIAL TO ENABLE REVERSIBLE CHANGE BETWEEN A TRANSPARENT STATE AND A COLORED STATE OF THE CHROMIC MATERIAL AND TRANSPARENT DISPLAY DEVICE HAVING THE SAME

CROSS REFERENCE OF RELATED APPLICATION

The present application claims the benefit of priority of patent application No. 201710850915.5 filed to the Chinese Patent Office on Sep. 20, 2017, the disclosure of which is incorporated herein by reference.

TECHNICAL FIELD

This disclosure relates to the field of display technology, particularly to a transparent display panel and a transparent display device.

BACKGROUND

Transparent display technology is increasingly valued, and can be applied in more and more settings, including, for example, the show window of the counter in a shop for exhibiting commodities and information thereof, the front windshield of a vehicle for performing real time road navigation, etc.

Transparent display panels generally have a color filter film, so as to enable the transparent display panel to display information such as color text images. However, color filter films can have relatively low transmittance, so when viewing objects behind a display panel through a transparent display panel, the clarity is relatively low, which is not advantageous for application of the transparent display technology. Hence, there is a need to improve the transmittance of the transparent display panel.

SUMMARY

An embodiment of this disclosure provides an inventive transparent display panel, comprising a liquid crystal cell, a chromic material and a trigger component. The liquid crystal cell comprises an array substrate and a first transparent substrate opposite to each other, a liquid crystal layer being arranged between the array substrate and the first transparent substrate. The chromic material is arranged at a side of the first transparent substrate away from the array substrate. The trigger component is connected to the chromic material for enabling reversible change between a transparent state and a colored state for the chromic material.

In some embodiments, the chromic material comprises a first material, a second material and a third material, the first material, the second material and the third material being capable of performing reversible change between red and transparent state, green and transparent state, blue and transparent state respectively under control of the trigger component.

In some embodiments, the first material, the second material and the third material are arranged in a same layer, and a sealant material is provided between the first material, the second material and the third material.

In some embodiments, the array substrate comprises a plurality of gate lines, a plurality of data lines and a plurality of pixel units, the plurality of gate lines intersecting with the plurality of data lines to define a plurality of sub-pixel units, each pixel unit comprising multiple sub-pixel units. The array substrate further comprises a plurality of switch circuits for controlling connection and disconnection between data lines corresponding to the pixel units, each of the switch circuits being connected between two adjacent data lines of data lines corresponding to each pixel unit.

In some embodiments, the switch circuit comprises a first thin film transistor. The array substrate further comprises a switch line insulated from the data line, a gate of the first thin film transistor being connected to the switch line so as to control on-off of the first thin film transistor, a source and a drain of the first thin film transistor being respectively connected to two adjacent data lines in the data lines corresponding to the pixel unit.

In some embodiments, the sub-pixel unit comprises a second thin film transistor and a pixel electrode, a gate of the second thin film transistor being connected to the gate line, a source of the second thin film transistor being connected to the data line, a drain of the second thin film transistor being connected to the pixel electrode.

In some embodiments, the chromic material is an electrochromic material.

Further, the trigger component comprises transparent electrode materials respectively attached to a side of the electrochromic material close to the first transparent substrate and a side of the electrochromic material away from the first transparent substrate.

In some embodiment, the transparent display panel further comprises a second transparent substrate located at a side of the chromic material away from the first transparent substrate.

Another embodiment of this disclosure provides a transparent display device, which comprises the transparent display panel as claimed in any of the preceding embodiments.

DETAILED DESCRIPTION OF EMBODIMENTS

In the following, the embodiments of this disclosure will be explained in more details in conjunction with the drawings and examples.

Figure 1:
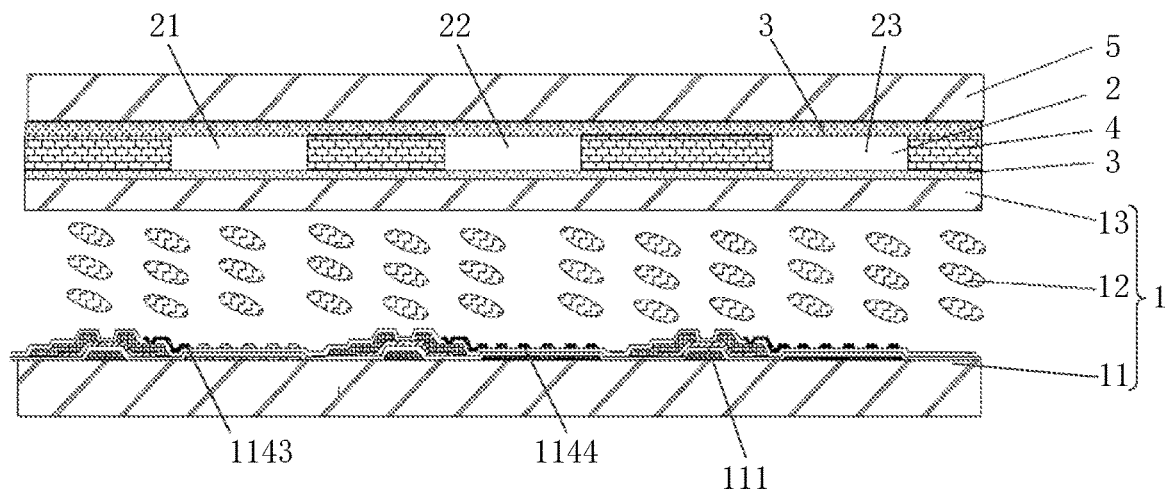
FIG. 1 is a structural schematic view of a transparent display panel provided by an embodiment of this disclosure.

As shown in FIG. 1, an embodiment of this disclosure provides a transparent display panel, comprising: a liquid crystal cell 1, a chromic material 2 and a trigger component 3. The liquid crystal cell 1 comprises an array substrate 11 and a first transparent substrate 13 opposite to each other, a liquid crystal layer 12 being arranged between the array substrate 11 and the first transparent substrate 12. The chromic material 2 is arranged at a side of the first transparent substrate 13 away from the array substrate 11. The trigger component is connected to the chromic material 2, to achieve a reversible change between a transparent state and a colored state for the chromic material 2.

The array substrate 11 can be provided with a driving circuit comprising an array of thin film transistors (TFT) 111, so as to control deflection of the liquid crystals in the liquid crystal layer 12, thereby driving the pixels to display corresponding information.

Various chromic materials are available, for example, electrochromic material, thermochromic material, photochromic material, etc. A corresponding trigger component 3 can be arranged to control change in color state of the chromic material 2 based on the trigger condition for changing color states of the chromic material. For example, in case the chromic material 2 is an electrochromic material, the trigger component 3 may employ a transparent electrode, through which an electric field can be applied to the electrochromic material, so as to change the color of the electrochromic material, and realize reversible change of the electrochromic material between the colored state and the transparent state. When the chromic material is a thermochromic material, the trigger component may include a transparent material connected with a temperature control device. The temperature control device can control the temperature of the transparent material to rise or fall. The transparent material is attached to the thermochromic material for controlling the temperature of the thermochromic material, so as to change the color of the thermochromic material. The selection and the design of the chromic material 2 and the trigger component 3 are not limited to the above examples, as long as the chromic material 2 can change between the transparent state and the colored state and would not shield the transparent display. The chromic material that can change from the transparent state to the colored state may be selected based on the color requirement of the information to be displayed. In an embodiment, the chromic material 2 comprises various materials, i.e., the various materials can change from the transparent state to the colored state with different colors respectively, and these materials can be arranged in a same layer. For example, in order to realize different color changes for the information to be displayed, the chromic material 2 may comprise three materials, which are capable of performing reversible change between the transparent state and the colored state with different colors (e.g., red, green, blue) respectively. The three materials can be arranged at a side of the first transparent substrate 13 of the liquid crystal cell 1 away from the array substrate 11, and arranged in the same layer according to certain rules, for example, according to the arrangement of the color films in the pixels commonly used in terminal devices such as a laptop.

Next, the embodiments of this disclosure will be explained specifically through the working principle of the transparent display panel. When the transparent display panel needs to display information such as color text images, an electric field can be generated by means of the array substrate 11, to control polarization of light that passes through the liquid crystal layer 12, meanwhile, the chromic material 2 is controlled by the trigger component 3 to present a colored state with a certain color, at this time, the chromic material 2 serves as a color film to display the required information such as color text images. When the transparent display panel needs to display the object behind it transparently, the chromic material 2 can be controlled by the trigger component 3 to present a transparent state, at this time, the color of the displayed information such as the literal images is removed, which is changed into a black and white image (which is also called as a gray level image). Under this mode, the chromic material is in a transparent state, so the transmittance is relatively high, thereby improving the transmittance of the transparent display panel. In this way, the transparent display panel can function in a color mode for displaying color information and a black and white mode with a high transmittance. The transparent display panel can switch between the color mode and the black and white mode.

Regarding the transparent display panel according to the embodiment of this disclosure, by arranging a chromic material at a side of the first transparent substrate of the liquid crystal cell away from the array substrate, and the chromic material being capable of performing reversible change between a transparent state and a colored state with a preset color under the control of the trigger component, an adjustable transmittance of the transparent display panel can be achieved. When the chromic material is in the colored state, the chromic material plays the function of a color filter film, so as to display color information with the transparent display panel. When the chromic material is in the transparent state, the chromic material has a relatively high transmittance, so as to enable the transmittance of the transparent display panel to be increased, so that the object behind the display panel can be seen clearly through the display panel, at this time, the information displayed on the transparent display panel is in a black and white display mode. Thus, the transparent display panel of the embodiment of this disclosure can switch between the color mode and the black and white mode, and can realize transparent displaying with high transmittance. When such a transparent display panel is applied in a scene such as the show window of the counter in a shop for exhibiting commodities and information thereof, as the transparent display panel has a higher transmittance, the light within the show window of the counter can be dimmed appropriately, so as to reduce power consumption.

According to an embodiment of this disclosure, the chromic material 2 comprises a first material 21, a second material 22 and a third material 23. The first material 21, the second material 22 and the third material 23 can perform reversible changes between the colored state with red, green and blue and a transparent state respectively. Examples of the second material that can present green color and transparent state include but are not limited to rhodium oxide ($Rh_2O_3$), examples of the third material that can present blue color and a transparent state include but are not limited to iridium oxide (IrOx), and examples of the first material that can present red color and a transparent state include but are not limited to viologens (also referred to as 1,1'-disubstituted group-4,4'-bipyridine). The red, green and blue are three primary colors (RGB), which can be mixed to obtain various colors. In an embodiment, each pixel region comprises three materials that can present red, green and blue, the region where each color locates can be called a sub-pixel region. That is to say, one pixel can serve as a basic display unit. An R sub-pixel, a G sub-pixel, and a B sub-pixel constitute one pixel, and each pixel can present different color changes. For example, for a display image with a resolution of 1024*768, which is composed of 1024*768 pixels, if each pixel comprises sub-pixels of RGB, then the display image comprises 1024*768*3 sub-pixels.

Figure 2:
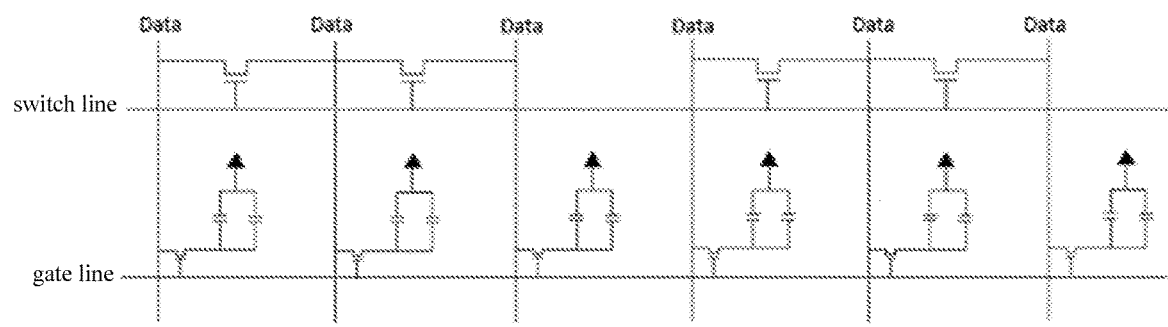
FIG. 2 is a schematic view of an equivalent driving circuit of an array substrate provided by an embodiment of this disclosure.
Figure 3:
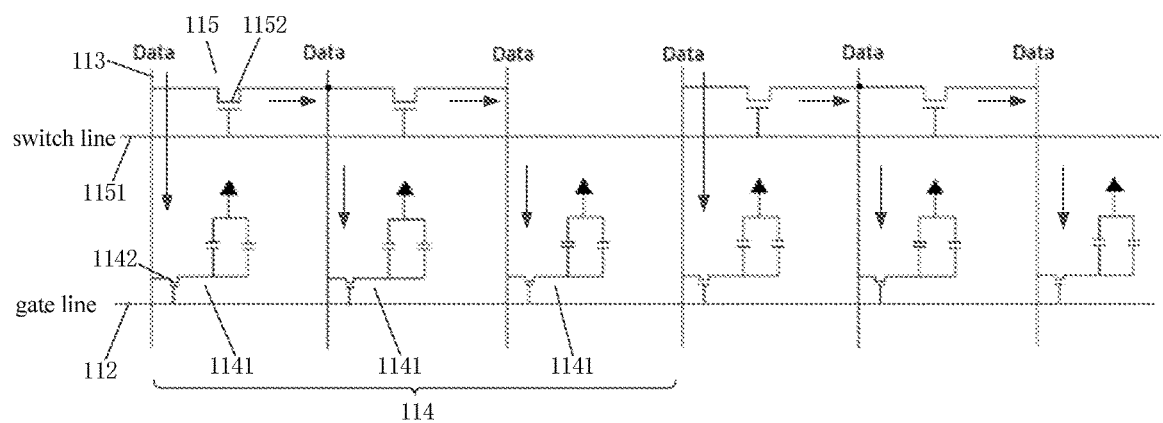
FIG. 3 is a schematic view showing a current signal direction in case the first thin film transistor in the equivalent driving circuit of the array substrate in FIG. 2 is in a turn-on state.
Figure 4:
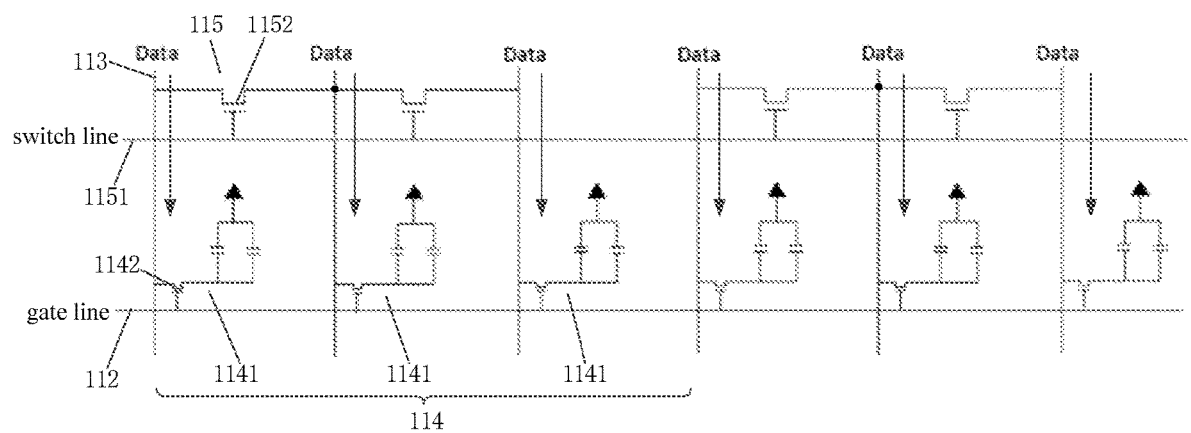
FIG. 4 is a schematic view showing a current single direction when the first thin film transistor in the equivalent driving circuit of the array substrate in FIG. 2 is in a turn-off state.

According to an embodiment of this disclosure, referring to FIG. 2, FIG. 3 and FIG. 4, the array substrate 11 comprises a plurality of gate lines 112, a plurality of data lines 113 and a plurality of pixel units 114. The plurality of gate lines 112 and the plurality data lines 113 are arranged to intersect with each other but in different layers, so as to define a plurality of sub-pixels units. Each pixel unit 114 can comprise a plurality of sub-pixel units 1141. The array substrate 11 further comprises a plurality of switch circuits 115, each switch circuit 115 being connected between adjacent data lines 113 corresponding to a pixel unit 114, for controlling connection and disconnection between the data lines 113 corresponding to each pixel unit 114. When the switch circuit 115 controls the data lines 113 corresponding to each pixel unit 114 to be connected to each other, sub-pixel units 1141 in the pixel unit 114 are driven with the same data voltage, thus, the data voltages can be provided for other data lines 113 corresponding to the pixel unit 114 only through one data line 113, thereby realizing data voltage driving for all sub-pixel units in a single pixel unit with one data line 113. Compared to the case that driving each pixel unit has to input a data voltage to respective data lines 113 corresponding to sub-pixel units in the pixel unit respectively, this embodiment reduces the calculation amount of the driving chip connected with the pixel unit 114 and reduces the power consumption. When the switch circuit controls the data lines 113 corresponding to each pixel unit 114 to connect with one another, the data voltages provided to sub-pixel units 1141 in the pixel unit 114 are the same, hence, the information image displayed by the pixel unit can be of a single color. At this time, the chromic material can be controlled to be in a transparent state, so as to reduce power consumption while increasing the transmittance of the transparent display panel.

According to an embodiment of the disclosure, the switch circuit 115 comprises a first thin film transistor 1152. The array substrate 11 further comprises a switch line 1151 arranged to intersect with the data lines 113 in different layers. The gate of the first thin film transistor 1152 is connected to the switch line 1151. The switch line 1151 is configured to control on and off of the first thin film transistor 1152. Two adjacent data lines 113 corresponding to a pixel unit 114 are connected to the source and the drain of the first thin film transistor 1152 respectively. The on-off of the first thin film transistor 1152 is controlled by a signal transmitted to the switch line 1151. The switch line 1151 is independent of the data line 113 and the gate line 112 respectively. When the first thin film transistors 1152 are turned on through the switch line 1151, the data lines 113 corresponding to a pixel unit 114 are connected with each other, thus, the data voltage signal can be provided to all data lines 113 corresponding to the pixel unit 114 only through one data line 113, therefore, each pixel unit can be driven by means of one data line 113, so as to reduce power consumption.

According to an embodiment of this disclosure, the sub-pixel unit 1141 comprises a second thin film transistor 1142 and a pixel electrode 1143. A gate of the second thin film transistor 1142 is connected to the gate line 112, a source of the second thin film transistor 1142 is connected to the data line 113, and a drain of the second thin film transistor 1142 is connected to a pixel electrode 1143. In the example of FIG. 1, a common electrode 1144 may be formed on the array substrate 11. In such a case, the common electrode 1144 and the pixel electrode 1143 are both located on the array substrate 11, and are located at the same side of the liquid crystal layer. In another embodiment, the common electrode can be arranged under the first transparent substrate 13 (not shown in the figure), in this case, the pixel electrode and the common electrode are formed at two sides of the liquid crystal layer respectively. The arrangement position of the common electrode is not limited herein. By transmitting a gate signal to the gate line 112, the second thin film transistor 1142 can be controlled to turn on. A data voltage signal can transmitted to the source of the second thin film transistor 1142 through the data line 113, at this time, the pixel electrode 1143 can be charged through the second thin film transistor 1142, so as to provide the pixel voltage required for displaying the image information.

In an embodiment, each pixel unit 114 comprises three sub-pixel units 1141, i.e., R sub-pixel unit, G sub-pixel unit and B sub-pixel unit. In this case, each pixel unit comprises three second thin film transistors 142 which drive the three sub-pixel units of RGB respectively. Each pixel unit 114 comprises two first thin film transistors 1152 which are connected between adjacent data lines corresponding to this pixel unit respectively. Referring to FIG. 3, the second thin film transistors 1142 are controlled to turn on by means of the gate signal transmitted by the gate line 112, the signal that enables the first thin film transistor 1152 to turn on is transmitted by the switch line 1151, so the three data lines 113 in each pixel unit 114 are connected with one another. At this time, a data voltage signal is inputted to one of the data lines 113, the data voltage signal charges the pixel electrode through the second thin film transistor 1142. Moreover, at this time, the data voltages provided to each sub-pixel units (RGB) are same, so the information image displayed is of a single color. The chromic material can be controlled to be in a transparent state at this point, so as to improve the transmittance of the transparent display panel. Referring to FIG. 4, when the transparent display panel displays a color information image, the chromic material is controlled to be in a colored state with a preset color, and transmission of signals to the switch line 1151 is stopped, so as to get the first thin film transistor 1152 turned off. At this point, the three data lines in each pixel unit are mutually independent, different data voltage signals may be inputted to the data lines 113 respectively, in order to control the color of the displayed image.

In the example of FIG. 1, the manufacturing process of the thin film transistor 111 may comprise processes of filming, exposing, developing, etching, stripping etc. The thin film transistor 111 can use an a-Si TFT, a low temperature poly-silicon (LTPS) TFT or an Oxide TFT etc.

In a specific example, the chromic material 2 is an electrochromic material. Under the effect of an applied electric field, stable and reversible color changes may occur to the electrochromic material. With the electrochromic material changing into a transparent state, its transmittance is gradually improved. Electrochromic materials have a stable performance, if a static image is displayed, no power will be consumed as long as the displayed content does not change. So the purpose of saving energy can be realized.

In an embodiment, a transparent electrode material is attached at a side of the electrochromic material close to the first transparent substrate and a side of the electrochromic material away from the first transparent substrate respectively. The transparent electrode material serves as the trigger component 3. The transparent electrode material is a material that can not only be conductive but also have a high transmittance in the visible range. An electric field is applied to two ends of the electrochromic material through the transparent electrode materials, so that voltage difference is formed across the electrochromic material, which causes the color of the electrochromic material to change. The transparent electrode material is attached to the electrochromic material, so as to control the electrochromic material directly, which is advantageous to regulate and control the color and transparency of the electrochromic material accurately.

According to another embodiment of this disclosure, a sealant material 4 is arranged between the first material 21, the second material 22 and the third material 23. The sealant material 4 is configured to separate the first material 21, the second material 22 and the third material 23 from each other, preventing mixture of the three materials. The sealant material 4 and the chromic material 2 are arranged in the same layer.

According to a further embodiment of this disclosure, a second transparent substrate 5 is arranged at a side of the chromic material 2 away from the first transparent substrate 13. The array substrate 11 is located at the bottom of the transparent display panel, and may serve as a back plate of the transparent display panel. The second transparent substrate 11 is located at the top of the transparent display panel, and may serve as a display plate of the transparent display panel. Hence, in this embodiment, the array substrate 11, the liquid crystal layer 12, the first transparent substrate 13, the transparent electrode material 3, the chromic material 2 and the sealant material 4, the transparent electrode material 3 and the second transparent substrate 5 are arranged successively from bottom to top. The first transparent substrate 13 and the second transparent substrate 15 both can be a glass substrate. The first transparent substrate 13 may isolate the liquid crystal of the liquid crystal layer 12 from the chromic material 2 in the transparent display panel, and can also play the function of supporting the components thereon.

A further embodiment of this disclosure provides a transparent display device, comprising the transparent display panel as stated in any of the preceding embodiments.

For the transparent display device provided by the embodiment of this disclosure, the transparent display panel thereof is provided with a chromic material at a side of the first transparent substrate away from the array substrate, the chromic material being capable of performing reversible change between a transparent state and a colored state with a certain color under the control of the trigger component, so an adjustable transmittance of the transparent display panel can be realized. When the chromic material is in the colored state, the chromic material plays the function of a color filter film, so as to display color information by the transparent display panel. When the chromic material is in the transparent state, the chromic material has a relatively high transmittance, the transmittance of the transparent display panel is enabled to be increased, so that the object behind the transparent display panel can be seen more clearly through the transparent display panel, at this time, the information displayed by the transparent display panel is in a black and white display state. Thus, the transparent display device of the embodiment of this disclosure can switch between a color mode and a black and white mode, and can realize transparent display of high transmittance in the black and white mode. When it is applied in a circumstance such as the show window of the counter in a shop for exhibiting commodities and information thereof, as the transmittance of the transparent display panel is relatively higher, the light within the show window of the counter can be dimmed appropriately, so as to reduce power consumption.

What are stated above are only some embodiments of this disclosure, however, the protection scope of the invention is not limited to these. Any modification or replacement that can be easily conceived by the skilled person familiar with the present technical field within the scope revealed by this disclosure should be encompassed within the scope of the invention. Therefore, the protection scope of the invention should be subject to the protection scopes of the claims.

The invention claimed is:

1. A transparent display panel, comprising:
    a liquid crystal cell, wherein the liquid crystal cell comprises an array substrate and a first transparent substrate arranged opposite one another, and wherein a liquid crystal layer is arranged between the array substrate and the first transparent substrate,
    a chromic material, wherein the chromic material is disposed at a side of the first transparent substrate away from the array substrate, and
    a trigger component, wherein the trigger component is connected to the chromic material and the trigger component is used for enabling reversible change between a transparent state and a colored state for the chromic material,
    wherein the chromic material comprises:
        a first material,
        a second material, and
        a third material;
    wherein the first material, the second material, and the third material are capable of performing reversible changes between red and transparent states, green and transparent states, blue and transparent states, respectively,
    wherein the reversible changes are accomplished through control of the trigger component, wherein the array substrate comprises a plurality of gate lines, a plurality of data lines, and a plurality of pixel units,
    wherein the plurality of gate lines intersect with the plurality of data lines to define a plurality of sub-pixel units, and wherein each pixel unit comprises multiple sub-pixel units,
    wherein the array substrate further comprises a plurality of switch circuits for controlling connection and disconnection between data lines corresponding to the pixel units, each of the switch circuits being connected between two adjacent data lines of data lines corresponding to each pixel unit,
    wherein each switch circuit comprises a first thin film transistor, the array substrate further comprises a switch line insulated from the data line, wherein a gate of the first thin film transistor is connected to the switch line so as to control an on-off state of the first thin film transistor, and a source and a drain of the first thin film transistor are respectively connected to two adjacent data lines of the data lines corresponding to the pixel unit.

2. The transparent display panel according to claim 1, wherein the first material, the second material, and the third material are arranged in a same layer, and a sealant material is provided between each of the first material, the second material and the third material.

3. The transparent display panel according to claim 1, wherein:
    the sub-pixel unit comprises a second thin film transistor and a pixel electrode,
    a gate of the second thin film transistor is connected to the gate line,
    a source of the second thin film transistor is connected to the data line, and
    a drain of the second thin film transistor is connected to the pixel electrode.

4. The transparent display panel according to claim 1, wherein the chromic material is an electrochromic material.

5. The transparent display panel according to claim 4, wherein the trigger component comprises transparent electrode materials respectively attached to a side of the electrochromic material close to the first transparent substrate and a side of the electrochromic material away from the first transparent substrate.

6. The transparent display panel according to claim 1, further comprising:
a second transparent substrate at a side of the chromic material away from the first transparent substrate.

7. A transparent display device, comprising the transparent display panel as claimed in claim 1.

8. The transparent display device according to claim 7, wherein the first material, the second material and the third material are arranged in a same layer, and a sealant material is provided between each of the first material, the second material and the third material.

9. The transparent display device according to claim 7, wherein:
the sub-pixel unit comprises a second thin film transistor and a pixel electrode,
a gate of the second thin film transistor is connected to the gate line,
a source of the second thin film transistor is connected to the data line, and
a drain of the second thin film transistor is connected to the pixel electrode.

10. The transparent display device according to claim 7, wherein the chromic material is an electrochromic material.

11. The transparent display device according to claim 10, wherein the trigger component comprises transparent electrode materials respectively attached to a side of the electrochromic material close to the first transparent substrate and a side of the electrochromic material away from the first transparent substrate.

12. The transparent display device according to claim 7, further comprising a second transparent substrate at a side of the chromic material away from the first transparent substrate.

* * * * *